(12) United States Patent
Husain et al.

(10) Patent No.: US 10,065,718 B1
(45) Date of Patent: Sep. 4, 2018

(54) ANTI-AIRCRAFT AUTONOMOUS UNDERSEA SYSTEM (AUS) WITH MACHINE VISION TARGET ACQUISITION

(71) Applicant: SparkCognition, Inc., Austin, TX (US)

(72) Inventors: Syed Mohammad Amir Husain, Georgetown, TX (US); John Rutherford Allen, Alexandria, VA (US)

(73) Assignee: SPARKCOGNITION, INC., Austin, TX (US)

( * ) Notice: Subject to any disclaimer, the term of this patent is extended or adjusted under 35 U.S.C. 154(b) by 0 days.

(21) Appl. No.: 15/704,949

(22) Filed: Sep. 14, 2017

(51) Int. Cl.
| | |
|---|---|
| *B63G 8/00* | (2006.01) |
| *B63G 8/28* | (2006.01) |
| *B63G 8/30* | (2006.01) |
| *F42B 19/00* | (2006.01) |
| *B63G 8/08* | (2006.01) |
| *G05D 1/12* | (2006.01) |
| *B64C 39/02* | (2006.01) |
| *F41H 11/02* | (2006.01) |

(52) U.S. Cl.
CPC ............ *B63G 8/001* (2013.01); *B63G 8/08* (2013.01); *B63G 8/28* (2013.01); *B63G 8/30* (2013.01); *B64C 39/024* (2013.01); *F41H 11/02* (2013.01); *F42B 19/00* (2013.01); *G05D 1/12* (2013.01); *B63G 2008/004* (2013.01)

(58) Field of Classification Search
CPC .... B63F 3/02; B63G 8/00; B63G 8/22; B63G 8/28; B63G 8/32; F03B 13/10; F41F 3/042; F41F 3/07; F41F 3/10; F41F 7/00; F42B 15/20; F42B 19/00

USPC .......... 114/20.1, 316, 317, 318, 319; 244/63
See application file for complete search history.

(56) References Cited

U.S. PATENT DOCUMENTS

| | | | | |
|---|---|---|---|---|
| 5,076,192 | A | * 12/1991 | Tegel | F41F 3/042 114/316 |
| 5,675,116 | A | * 10/1997 | Hillenbrand | B63G 8/22 114/316 |
| 5,995,882 | A | 11/1999 | Patterson et al. | |
| 6,118,066 | A | * 9/2000 | Sirmalis | F42B 19/00 114/20.1 |
| 6,376,762 | B1 | * 4/2002 | French | F41F 3/10 114/316 |
| 7,290,496 | B2 | 11/2007 | Asfar et al. | |
| 7,556,219 | B2 | 7/2009 | Page et al. | |
| 8,091,461 | B1 | 1/2012 | Buescher et al. | |
| 8,899,903 | B1 | 12/2014 | Saad et al. | |
| 9,211,959 | B2 | 12/2015 | Teller et al. | |

(Continued)

*Primary Examiner* — Lars A Olson
(74) *Attorney, Agent, or Firm* — Toler Law Group, PC

(57) ABSTRACT

A submersible vessel comprises a hull. The hull contains a plurality of subsystems. The subsystems comprise a sensor subsystem configured to sense potential target information regarding a potential target, a database subsystem configured to store target characterization information, a processing subsystem coupled to the sensing subsystem and to the database subsystem, and an ordnance subsystem. The processing subsystem is configured to process the potential target information according to the target characterization information to confirm the potential target as being a confirmed target. The ordnance subsystem comprises an ordnance magazine configured to store ordnance. The ordnance is deployable against the confirmed target, wherein the confirmed target is an aircraft.

20 Claims, 14 Drawing Sheets

(56) References Cited

U.S. PATENT DOCUMENTS

| | | |
|---|---|---|
| 9,348,333 B1 | 5/2016 | Buchmueller et al. |
| 9,387,928 B1 | 7/2016 | Gentry et al. |
| 9,611,017 B2 | 4/2017 | Jeng |
| 9,623,760 B2 | 4/2017 | Wang et al. |
| 9,828,094 B2 | 11/2017 | McMillion |
| 9,944,404 B1 | 4/2018 | Gentry |
| 2003/0152892 A1 | 8/2003 | Huang et al. |
| 2008/0041294 A1 | 2/2008 | Diorio et al. |
| 2011/0266086 A1 | 11/2011 | Welker et al. |
| 2013/0081245 A1 | 4/2013 | Vavrina et al. |
| 2013/0199792 A1 | 8/2013 | Backes |
| 2015/0298786 A1 | 10/2015 | Stigler et al. |
| 2016/0039541 A1 | 2/2016 | Beardsley et al. |
| 2016/0244135 A1 | 8/2016 | Farber et al. |
| 2016/0327956 A1 | 11/2016 | Zhang et al. |
| 2017/0285203 A1 | 10/2017 | Fyffe et al. |
| 2017/0350558 A1 | 12/2017 | Heinen et al. |

\* cited by examiner

ANTI-AIRCRAFT AUTONOMOUS UNDERSEA SYSTEM (AUS) WITH MACHINE VISION TARGET ACQUISITION

CROSS-REFERENCE TO RELATED APPLICATION(S)

The present application is related to co-pending U.S. Patent Application entitled "AUTONOMOUS VESSEL FOR UNMANNED COMBAT AERIAL VEHICLE (UCAV) CARRIER OPERATIONS" (Ser. No. 15/704,855); co-pending U.S. Patent Application entitled "STACKABLE UNMANNED AERIAL VEHICLE (UAV) SYSTEM AND PORTABLE HANGAR SYSTEM THEREFOR" (Ser. No. 15/704,908); co-pending U.S. Patent Application entitled "AERIALLY DISPERSIBLE MASSIVELY DISTRIBUTED SENSORLET SYSTEM" (Ser. No. 15/704,991); and co-pending U.S. Application entitled "ARTIFICIAL INTELLIGENCE AUGMENTED REALITY COMMAND, CONTROL AND COMMUNICATIONS SYSTEM" (Ser. No. 15/705,027), the entirety of which are herein incorporated by reference.

BACKGROUND

Field of the Disclosure

The present disclosure relates generally to a naval air defense system and, more particularly, to an unmanned naval air defense system.

Background of the Disclosure

Assets, such as naval vessels, face threats, such as aircraft and the weapons aircraft may deliver against such assets. As technology makes it easier and less expensive to construct and deploy systems that pose such threats, a corresponding increase in the availability and capability of technology to protect against such threats is needed.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

In accordance with at least one embodiment, a submersible vessel provides protection against threats, for example, hostile aircraft. The submersible vessel comprises an ordnance subsystem. The ordnance subsystem comprises an ordnance magazine configured to store ordnance. The ordnance is deployable against a target. The target can be autonomously identified by the submersible vessel, or the target can be remotely identified by another asset, such as a peer submersible vessel, a naval surface vessel, a naval subsurface vessel, an aircraft, or a spacecraft, such as a satellite. Alternatively, the target can be cooperatively identified by the submersible vessel and at least one other asset.

In accordance with at least one embodiment, a plurality of submersible vessels can cooperatively engage threats. For example, the plurality of submersible vessels can coordinate with each other to observe, confirm, track, and engage threats by efficiently allocating resources, such as ordnance, among themselves. As one example, the plurality of submersible vessels can create a "dome" of protection around assets, such as naval vessels or civilian vessels. As another example, one or more submersible vessels can provide a low-maintenance deterrent against threats even in absence of proximate assets, for example, by providing a high-endurance deployed system ready to detect and engage threats, such as anti-submarine warfare (ASW) aircraft. As an example, a submersible vessel may be an anti-aircraft autonomous undersea system (AUS).

Figure 1:
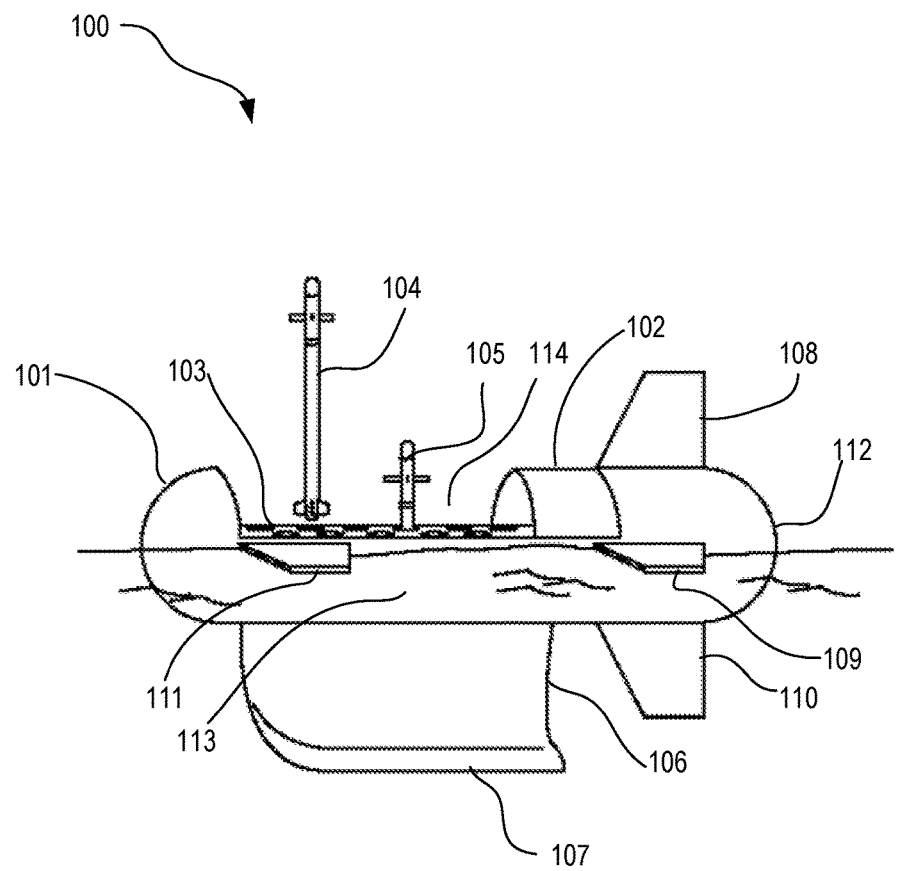
FIG. 1 is an elevation view diagram illustrating an anti-aircraft autonomous undersea system (AUS) in accordance with at least one embodiment.

FIG. 1 is an elevation view diagram illustrating an anti-aircraft autonomous undersea system in accordance with at least one embodiment. Anti-aircraft AUS 100 comprises a hull 113 having a bow 101 and a stern 112. Hull 113 defines an opening 114 in an upper portion of AUS 100 to allow ordnance stowed in ordnance magazine 103 within AUS 100 to be delivered out of AUS 100 toward one or more targets. AUS 100 comprises movable cover 102 to provide selective closure of opening 114.

AUS 100 comprises keel 106 with keel weight 107 along a lower edge of keel 106. Keel 106 is coupled to the bilge of hull 113. AUS 100 comprises control surfaces, including lateral fore fin 111, lateral aft fin 109, upper vertical fin 108, and lower vertical fin 110. Upper vertical fin 108, lower vertical fin 110, and lateral aft fin 109 are coupled to an aft portion of hull 113. Lateral fore fin 111 is coupled to a fore portion of hull 113.

As illustrated, movable cover 102 is moved from opening 114. With opening 114 open, ordnance from ordnance magazine 103 may be delivered from AUS 100. As shown, anti-aircraft missile 104 and anti-aircraft missile 105 are examples of ordnance being launched from ordnance magazine 103 through opening 114.

In accordance with one embodiment, AUS 100 may be a flooded vessel having sealed modules within it to provide water protection individually to each subsystem, portion of a subsystem, or combination of subsystems in a module. In accordance with another embodiment, AUS 100 may be a sealed vessel, maintaining a dry environment internally until movable cover 102 is opened. In accordance with another embodiment, a portion of AUS 100 may be a sealed vessel and another portion of AUS 100 may be a flooded vessel.

As one example, AUS 100 may be maintained in a submersed configuration, guided by communication with a peer network or a command and control system to surface for engaging targets. As another example, AUS 100 can be maintained in a surface configuration, allowing AUS 100 to utilize its own subsystems for target acquisition, target confirmation, and target tracking, as well as target engagement.

Figure 2:
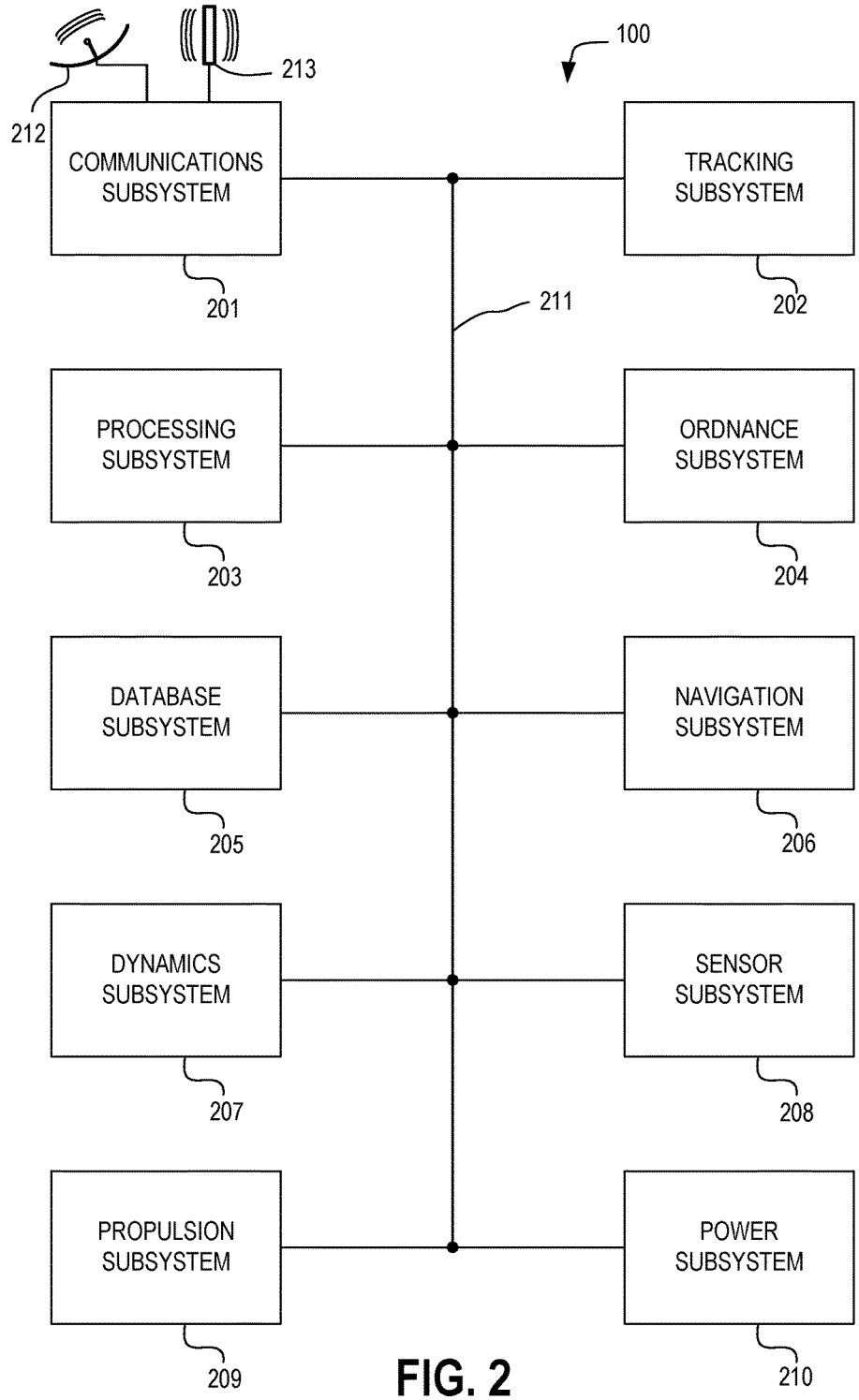
FIG. 2 is a block diagram illustrating an anti-aircraft AUS in accordance with at least one embodiment.

FIG. 2 is a block diagram illustrating an anti-aircraft AUS in accordance with at least one embodiment. Anti-aircraft AUS 100 comprises communications subsystem 201, tracking subsystem 202, processing subsystem 203, ordnance subsystem 204, database subsystem 205, navigation subsystem 206, dynamics subsystem 207, sensor subsystem 208, propulsion subsystem 209, and power subsystem 210. Each of such subsystems is coupled to at least another of such subsystems. In the illustrated example, the subsystems are coupled to each other via interconnect 211. Communications subsystem 201 may be coupled to antennas, such as satellite antenna 212 and terrestrial antenna 213. Other embodiments may be implemented with a subset of the above subsystems or with additional subsystems beyond the above subsystems or a subset thereof.

Figure 3:
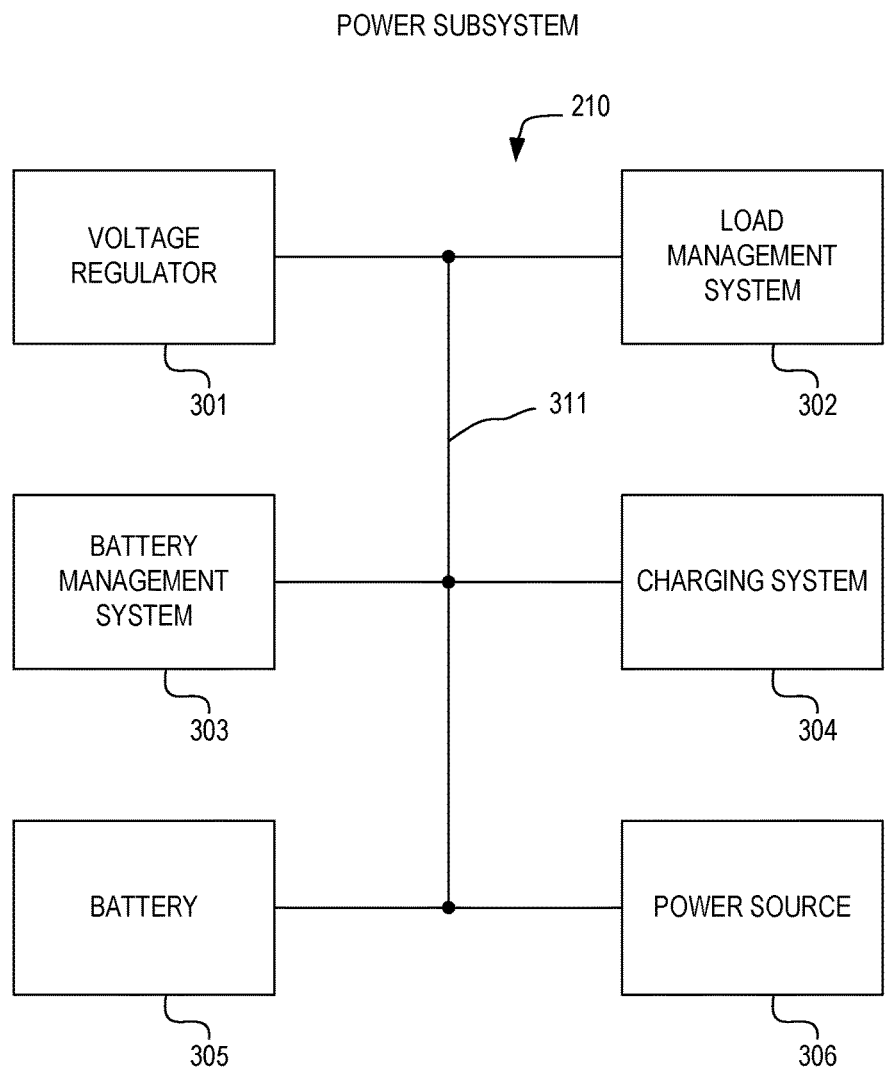
FIG. 3 is a block diagram illustrating a power subsystem of an anti-aircraft AUS in accordance with at least one embodiment.

FIG. 3 is a block diagram illustrating a power subsystem of an anti-aircraft AUS in accordance with at least one embodiment. Power subsystem 210 comprises voltage regulator 301, load management system 302, battery management system 303, charging system 304, battery 305, and power source 306. Each of such elements is coupled to at least another of such elements. In the illustrated example, the elements are coupled to each other via interconnect 311.

As examples, power source 306 can be a solar power source, a wind power source, a wave power source, a hydrothermal power source, a chemical fuel power source, a nuclear power source, or another type of power source. Charging system 304 can be configured to charge battery 305 using power obtained from power source 306. Battery management system can manage a battery state of battery 305 and can monitor charging and discharging of battery 305. Load management system 302 can monitor power used by loads, such as other subsystems shown in FIG. 2. Voltage regulator 301 can provide one or more regulated voltages to the loads.

Figure 4:
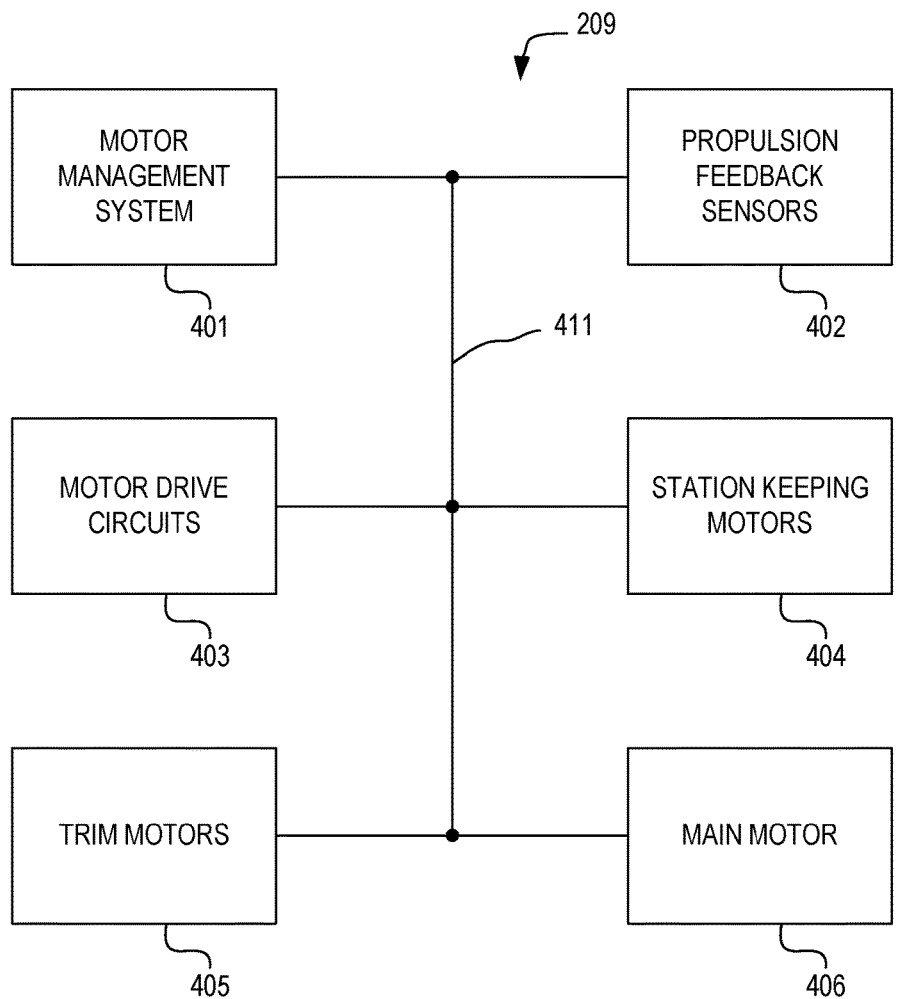
FIG. 4 is a block diagram illustrating a propulsion subsystem of an anti-aircraft AUS in accordance with at least one embodiment.

FIG. 4 is a block diagram illustrating a propulsion subsystem of an anti-aircraft AUS in accordance with at least one embodiment. Propulsion subsystem 209 comprises motor management system 401, propulsion feedback sensors 402, motor drive circuits 403, station keeping motors 404, trim motors 405, and main motor 406. Each of such elements is coupled to at least another of such elements. In the illustrated example, the elements are coupled to each other via interconnect 411.

Main motor 406 can provide main propulsion of anti-aircraft AUS 100. Such main propulsion can allow anti-aircraft AUS 100 to move to a deployment location. Such main propulsion can also allow anti-aircraft AUS 100 to move in relation to other vessels, such as other instances of anti-aircraft AUS 100 and a formation of naval vessels. Trim motors 405 can provide propulsive force to counteract force that would change the orientation of anti-aircraft AUS 100 away from a desired orientation. As examples, trim motors 405 can compensate for forces that would tend to impart undesired pitch, yaw, and roll to anti-aircraft AUS 100. Station keeping motors 404 can provide propulsive force to counteract currents that would cause anti-aircraft AUS 100 to drift away from its deployment location. As examples, station keeping motors 404 can be oriented along a plurality of axes, such as x, y, and z orthogonal axes, to allow station keeping in three dimensions. Motor drive circuits 403 are coupled to main motor 406, trim motors 405, and station keeping motors 404 to provide electrical motor drive signals to drive such motors. Power for the electrical motor drive signals can be obtained from power subsystem 210. Propulsion feedback sensors 402 can monitor the propulsion provided by the motors of propulsion subsystem 209. As an example, propulsion feedback sensors 402 can include pressure sensors to measure pressures produced by movement of water by propulsion system elements. As another example, propulsion feedback sensors 402 can include accelerometers to measure acceleration provided by propulsion system elements. Motor management system 401 can use information from propulsion feedback sensors 402 to cause motor drive circuits 403 to drive main motor 406, trim motors 405, and station keeping motors 404 to provide desired propulsion.

Figure 5:
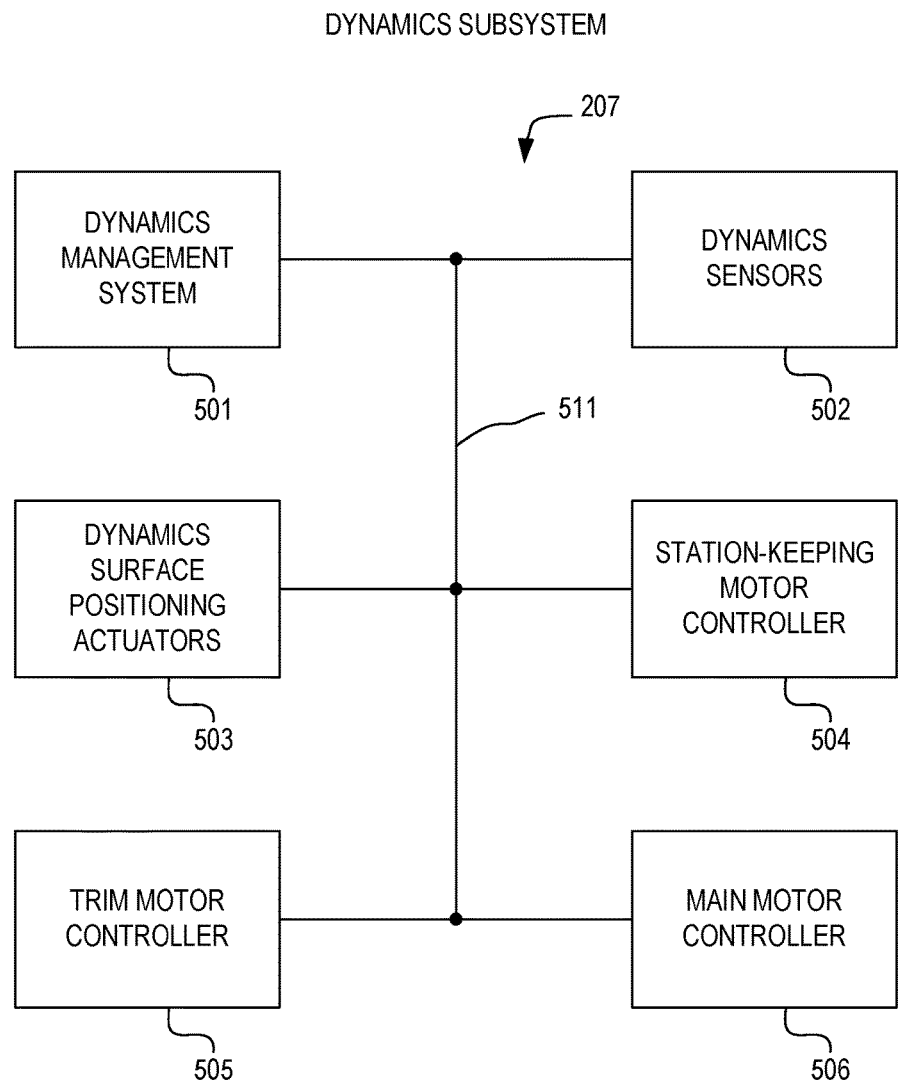
FIG. 5 is a block diagram illustrating a dynamics subsystem of an anti-aircraft AUS in accordance with at least one embodiment.

FIG. 5 is a block diagram illustrating a dynamics subsystem of an anti-aircraft AUS in accordance with at least one embodiment. Dynamics subsystem 207 comprises dynamics management system 501, dynamics sensors 502, dynamics surface positioning actuators 503, station-keeping motor controller 504, trim motor controller 505, and main motor controller 506. Each of such elements is coupled to at least another of such elements. In the illustrated example, the elements are coupled to each other via interconnect 511.

Dynamics sensors 502 sense dynamic forces and responsiveness of anti-aircraft AUS 100 to such dynamic forces. Examples of dynamic sensors 502 include pressure sensors, strain gauges, and fluid dynamics sensors. Dynamics management system 501 uses the sensed data from dynamics sensors 502 to provide dynamics control signals to dynamics surface positioning actuators 503, to main motor controller 506, to trim motor controller 505, and to station-keeping motor controller 504. Dynamics surface positioning actuators 503 can comprise, for example, actuators to orient hydrodynamic surfaces of anti-aircraft AUS 100 to adjust the responsiveness of anti-aircraft AUS 100 to hydrodynamic forces exerted upon it. Main motor controller 506, trim motor controller 505, and station-keeping motor controller 504 can provide dynamics control signals to adjust the operation of main motor 406, trim motors 405, and station keeping motors 404, respectively, as dictated by dynamics management system 501 in response to dynamics sensor data from dynamics sensors 502.

Figure 6:
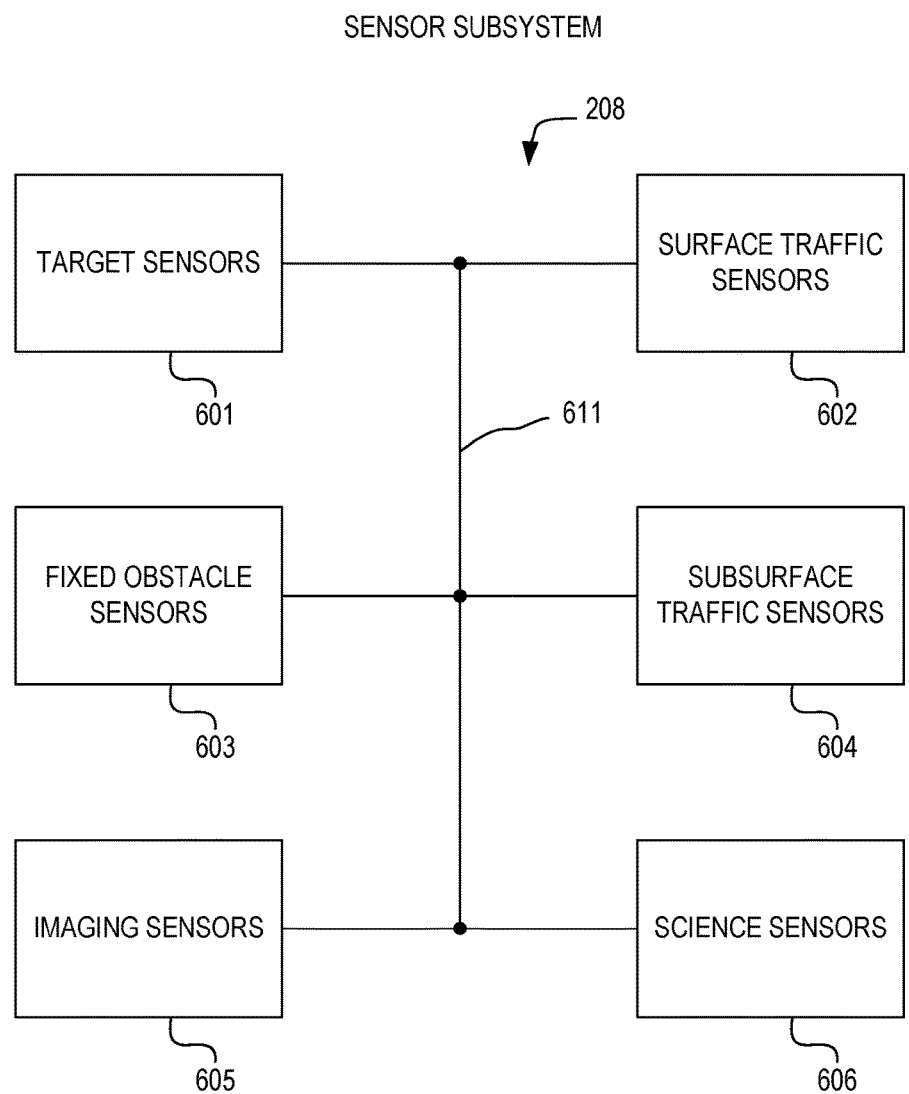
FIG. 6 is a block diagram illustrating a sensor subsystem of an anti-aircraft AUS in accordance with at least one embodiment.

FIG. 6 is a block diagram illustrating a sensor subsystem of an anti-aircraft AUS in accordance with at least one embodiment. Sensor subsystem 208 comprises target sensors 601, surface traffic sensors 602, fixed obstacle sensors 603, subsurface traffic sensors 604, imaging sensors 605, and science sensors 606. In some implementations, the sensor subsystem 208 also includes a passive aircraft sensor subsystem. Each of such elements is coupled to at least another of such elements. In the illustrated example, the elements are coupled to each other via interconnect 611.

Target sensors 601 include sensors suitable for sensing a target suitable for engagement with ordnance subsystem 204 of anti-aircraft AUS 100. Examples of target sensors 601 include a monostatic radar, a bistatic radar receiver, a bistatic radar transmitter, an infrared sensor, and a passive acoustic sensor. Surface traffic sensors 602 include sensors suitable for sensing traffic of surface vessels on a surface of water in which anti-aircraft AUS 100 operates. Examples of surface traffic sensors 602 include a monostatic radar, a bistatic radar receiver, a bistatic radar transmitter, an infrared sensor, an active acoustic sensor, and a passive acoustic sensor. Fixed obstacle sensors 603 include sensors suitable for sensing fixed obstacles. Examples of fixed obstacle sensors 603 include a monostatic radar, a bistatic radar receiver, a bistatic radar transmitter, an infrared sensor, an active acoustic sensor, a passive acoustic sensor, and a depth profiler. Subsurface traffic sensors 604 include sensors suitable for sensing traffic of subsurface vessels below a surface of water in which anti-aircraft AUS 100 operates. Examples of subsurface traffic sensors 604 include an active acoustic sensor, a passive acoustic sensor, and a magnetic sensor. The magnetic sensor may include, for example, a magnetometer or a magnetic anomaly detector. Imaging sensors 605 include sensors capable of obtaining images. Examples of imaging sensors 605 include visible still cameras, visible video cameras, infrared cameras, ultraviolet cameras, star tracking cameras, and other cameras.

Imaging sensors 605 can comprise sensors such as side scan sonar (SSS), synthetic aperture sonar (SAS), multibeam echosounders (MBES), imaging sonar, sub-bottom profiler (SBP), video cameras, still cameras, infrared cameras, multispectral cameras, and other types of imaging sensors. Science sensors 606 can comprise sensors such as conductivity, temperature, and depth (CTD) sensors, conductivity and temperature (CT) sensors, fluorometers, turbidity sensors, sound velocity sensors, beam attenuation meters, scattering meters, transmissometers, and magnetometers.

Figure 7:
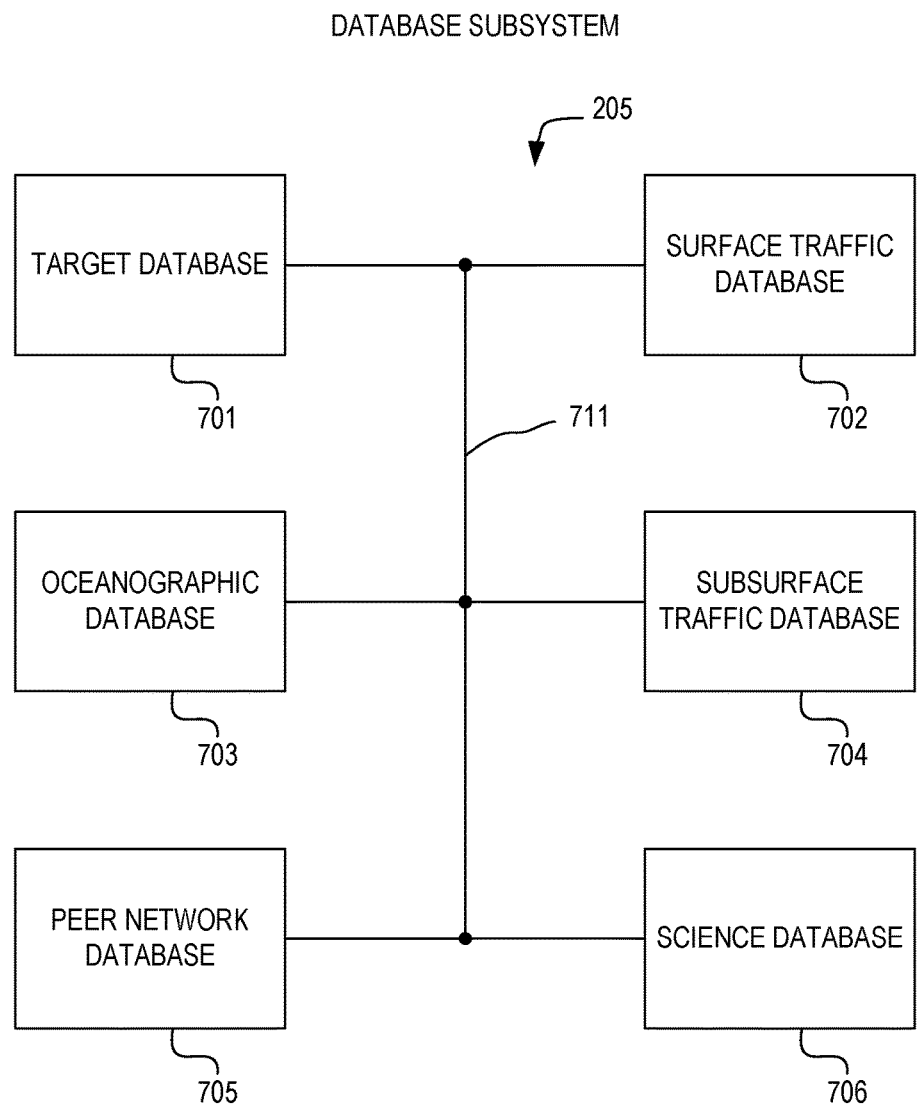
FIG. 7 is a block diagram illustrating a database subsystem of an anti-aircraft AUS in accordance with at least one embodiment.

FIG. 7 is a block diagram illustrating a database subsystem of an anti-aircraft AUS in accordance with at least one embodiment. Database subsystem 205 comprises target database 701, surface traffic database 702, oceanographic database 703, subsurface traffic database 704, peer network database 705, and science database 706. Each of such elements is coupled to at least another of such elements. In the illustrated example, the elements are coupled to each other via interconnect 711.

Target database 701 is a database for storing information characterizing potential targets and other information useful for distinguishing non-targets from targets. As examples, target database 701 may include information such as identification friend or foe (IFF) information, radar signature information, infrared signature information, and acoustic signature information as may pertain to aircraft. Surface traffic database 702 is a database for storing information characterizing potential surface traffic. As examples, surface traffic database 702 may include information such as radar signature information, infrared signature information, and acoustic signature information as may pertain to surface vessels. Oceanographic database 703 is a database for storing information characterizing physical features of the operating environment, such as an ocean, of anti-aircraft AUS 100. As examples, oceanographic database 703 may include information as to ocean floor topography, ocean currents, islands, coastlines, and other features. Subsurface traffic database 704 is a database for storing information characterizing potential subsurface traffic. As examples, subsurface traffic database 704 may include information such as acoustic signature information as may pertain to subsurface vessels. Peer network database 705 is a database for storing information characterizing a relationship of anti-aircraft AUS 100 to other instances of anti-aircraft AUS 100 capable of operating cooperatively as peers with anti-aircraft AUS 100. As examples, subsurface traffic database 704 may include information as to locations of peers, sensor parameters of peers, ordnance capabilities of peers, readiness of peers, and other properties of peers. Science database 706 is a database for storing information of a scientific nature, such as water temperature, water salinity, water conductivity, water density, water turbidity, air temperature, barometric pressure, sky conditions, and other information descriptive of conditions of the environment within which anti-aircraft AUS 100 operates.

Figure 8:
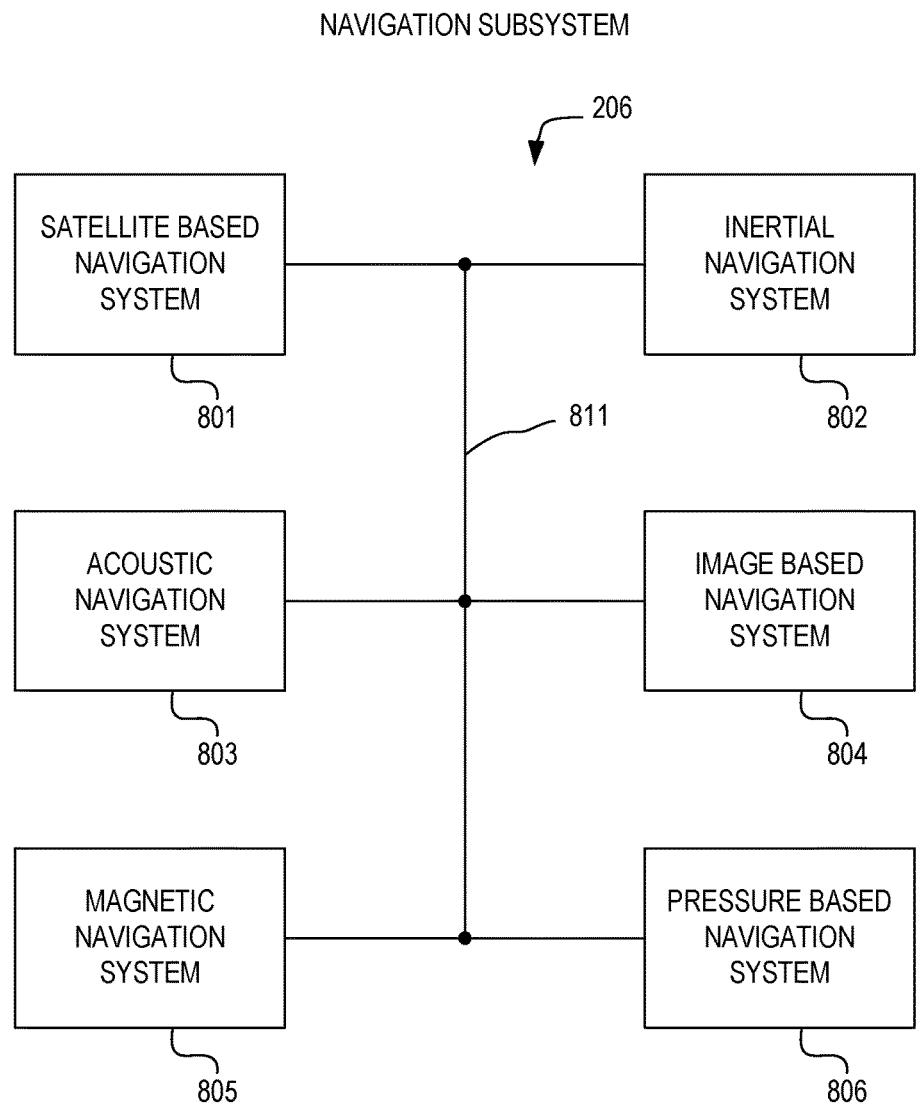
FIG. 8 is a block diagram illustrating a navigation subsystem of an anti-aircraft AUS in accordance with at least one embodiment.

FIG. 8 is a block diagram illustrating a navigation subsystem of an anti-aircraft AUS in accordance with at least one embodiment. Navigation subsystem 206 comprises satellite based navigation system 801, inertial navigation system 802, acoustic navigation system 803, image based navigation system 804, magnetic navigation system 805, and pressure based navigation system 806. Each of such elements is coupled to at least another of such elements. In the illustrated example, the elements are coupled to each other via interconnect 811.

Satellite based navigation system 801 can comprise, for example, a Global Navigation Satellite System (GLONASS) receiver and a Global Positioning System (GPS) receiver, which may include a Selective Availability/Anti-Spoofing Module (SAASM), a precise pseudo-random code (P-code) module, and an encrypted precise pseudo-random code (Y-code) module. Inertial navigation system 802 can comprise an inertial navigation sensor (INS) and an inertial measurement unit (IMU), which can comprise at least one of an accelerometer, a gyroscope, and a magnetometer.

Acoustic navigation system 803 can comprise, for example, Ultra Short Baseline (USBL) system, Long Baseline (LBL) system, a Doppler Velocity Logger (DVL), and an acoustic tracking transponder. Magnetic navigation system 805 can comprise, for example, a compass. Pressure based navigation system 806 can comprise, for example, an altimeter and a pressure sensor.

Figure 9:
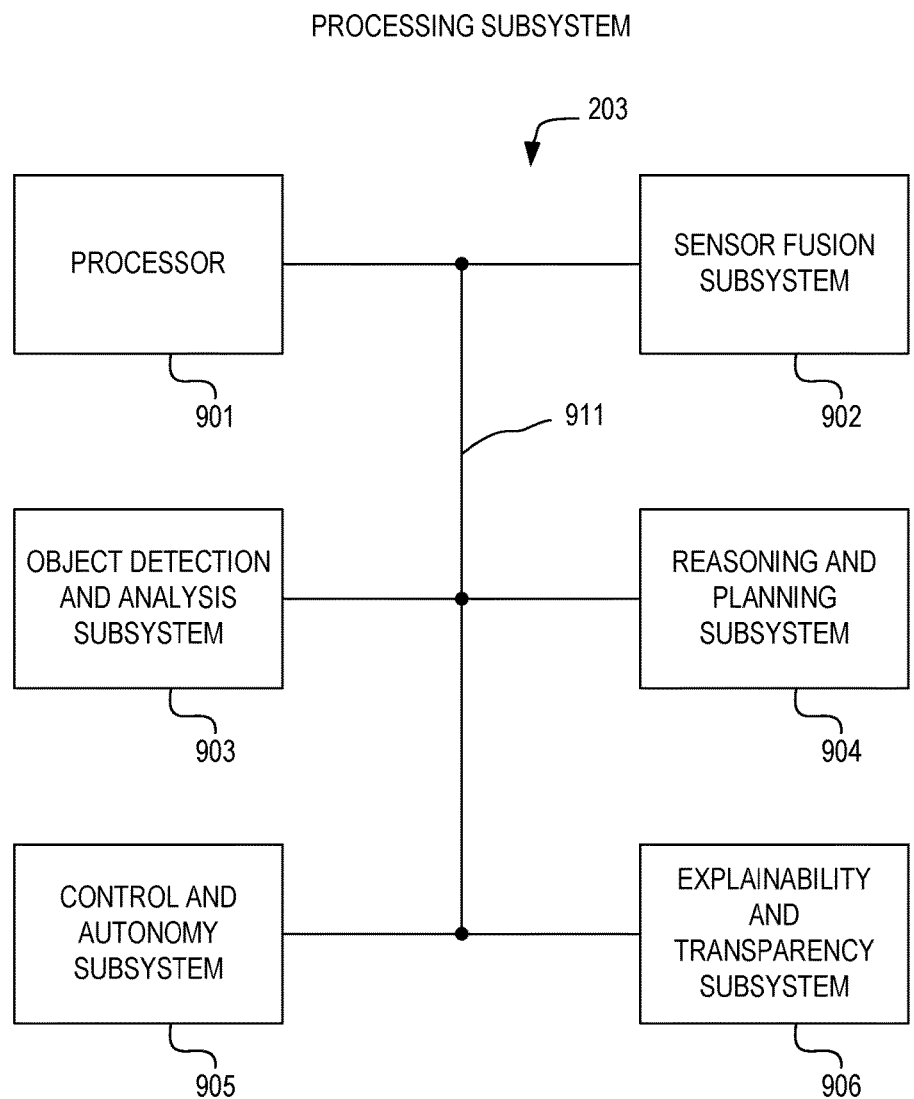
FIG. 9 is a block diagram illustrating a processing subsystem of an anti-aircraft AUS in accordance with at least one embodiment.

FIG. 9 is a block diagram illustrating a processing subsystem of an anti-aircraft AUS in accordance with at least one embodiment. Processing subsystem 203 comprises processor 901, sensor fusion subsystem 902, object detection and analysis subsystem 903, reasoning and planning subsystem 904, control and autonomy subsystem 905, and explainability and transparency subsystem 906. Each of such elements is coupled to at least another of such elements. In the illustrated example, the elements are coupled to each other via interconnect 911. The processing subsystem 203 is configured to provide autonomous control of the anti-aircraft AUS.

Processor 901 is a data processor for processing information within anti-aircraft AUS 100. Processor 901 can cooperate with subsystems of processing subsystem 203, such as sensor fusion subsystem 902, object detection and analysis subsystem 903, reasoning and planning subsystem 904, control and autonomy subsystem 905, and explainability and transparency subsystem 906. As one example, processing subsystem 203 can be implemented to utilize heterogeneous computing, wherein the different elements of processing subsystem 203 are implemented using different configurations of processor circuits, in accordance with at least one embodiment. As another example, a homogeneous computing system comprising similar configurations of processor circuits, such as a symmetric multiprocessor (SMP) system, can be used to implement processing subsystem 203.

Sensor fusion subsystem 902 processes sensor data obtained by sensors, such as sensors of sensor subsystem 208. Sensor data can be obtained from sensors local to anti-aircraft AUS 100 or from remote sensors located elsewhere, for example, on other instances of anti-aircraft AUS 100, on other vessels, or on other platforms, such as satellites, aircraft, or fixed locations. Sensor fusion subsystem 902 provides fidelity enhancement with multi-sensor feeds. As an example, sensor fusion subsystem 902 compares sensor data from multiple sensors to cross-validate the sensor data. The sensor data being cross-validated can be homogeneous, having been obtained from different instances of a similar type of sensor, can be heterogeneous, having been obtained from different types of sensors, or can have homogeneous and heterogeneous aspects, having been obtained from different instances of a similar type of sensor for each of a plurality of different types of sensors.

Sensor fusion subsystem 902 provides noise reduction and bad data identification via deep artificial neural networks (ANNs). Deep artificial neural networks are configured to recognize spurious data that, if relied upon, could lead to improper decision making. The deep artificial neural networks can acquire knowledge that can be stored within the adaptive elements of the deep artificial neural networks, and that acquired knowledge can be used for subsequent decision making. As an example, as a wide range of sensor data is obtained over time, sensor fusion subsystem 902 can learn to distinguish between, as examples, civilian aircraft, friendly military aircraft, and hostile military aircraft.

Sensor fusion subsystem 902 provides automated feature construction and evolution. By processing sensor data to identify features of a potential target that can be recognized from the information provided by the sensor data and adaptively modifying the processing of the sensor data over time to improve the identification of such features, feature recognition provided by sensor fusion subsystem 902 can improve identification of actual targets from among potential targets.

Sensor fusion subsystem 902 can combine augmented reality (AR) with virtual reality (VR) and predictive algorithms to facilitate application of information obtained from sensors to create an easily comprehensible presentation of a situation. For example, sensor fusion subsystem 902 can effectively filter out extraneous information, such as weather conditions and countermeasure effects, to provide a clear presentation of a target. The presentation of the target can be made with respect to anti-aircraft AUS 100, for example, with respect to the engagement range of the ordnance of ordnance subsystem 204 of anti-aircraft AUS 100.

Object detection and analysis subsystem 903 utilizes machine vision techniques to process sensor data to recognize an object the sensor data represents. Object detection and analysis subsystem 903 provides multi-spectral, cross-sensor analysis of sensor data, correlating sensor data of different types and of different sensors to assemble an accurate characterization of a detected object. Object detection and analysis subsystem 903 can perform new object discovery, utilizing unsupervised learning, which can identify the presence of new types of objects not previously known to exist or not previously having been identifiable based on previous processing of sensor data. Object detection and analysis subsystem 903 can provide a comprehensive vision of detectable objects and can apply ontologies to characterize such objects and their potential significance in a battlespace.

Reasoning and planning subsystem 904 can apply strategy generation techniques and strategy adaptation techniques to develop and adapt a strategy for protecting anti-aircraft AUS 100 and other assets in concert with which anti-aircraft AUS 100 may be deployed, for example, other instances of anti-aircraft AUS 100 and naval vessels that may be protected by anti-aircraft AUS 100. Reasoning and planning subsystem 904 can apply reality vectors to provide a thought-vector-like treatment of a real state of anti-aircraft AUS 100 and its surroundings. Reasoning and planning subsystem 904 can apply reinforcement learning and evolutionary processes to accumulate knowledge during the course of its operation.

Control and autonomy subsystem 905 utilizes platforms to transform a large amount of data into situational awareness. For example, control and autonomy subsystem 905 can utilize simulation engines to transform data, such as sensor data and object information obtained from sensor data, into an understanding of the situation faced by anti-aircraft AUS 100 that allows control and autonomy subsystem 905 to initiate action, such as engagement of a target using the ordnance of ordnance subsystem 204. Control and autonomy subsystem 905 can utilize reinforcement learning applications to evolve controllers, which can be used to autonomously control anti-aircraft AUS 100. Control and autonomy subsystem 905 can utilize swarm constrained deep learning for distributed decision making.

Explainability and transparency subsystem 906 can perform analysis and observation by applying natural language processing (NLP) and natural language generation (NLG) to produce natural language reports. Explainability and transparency subsystem 906 can perform hypothesis validation, enabling autonomous research to be performed by anti-aircraft AUS 100. Explainability and transparency subsystem 906 can perform automated ontology discovery, allowing anti-aircraft AUS 100 to recognize and respond to threats that do not fit within an existing knowledge base of threats.

Figure 10:
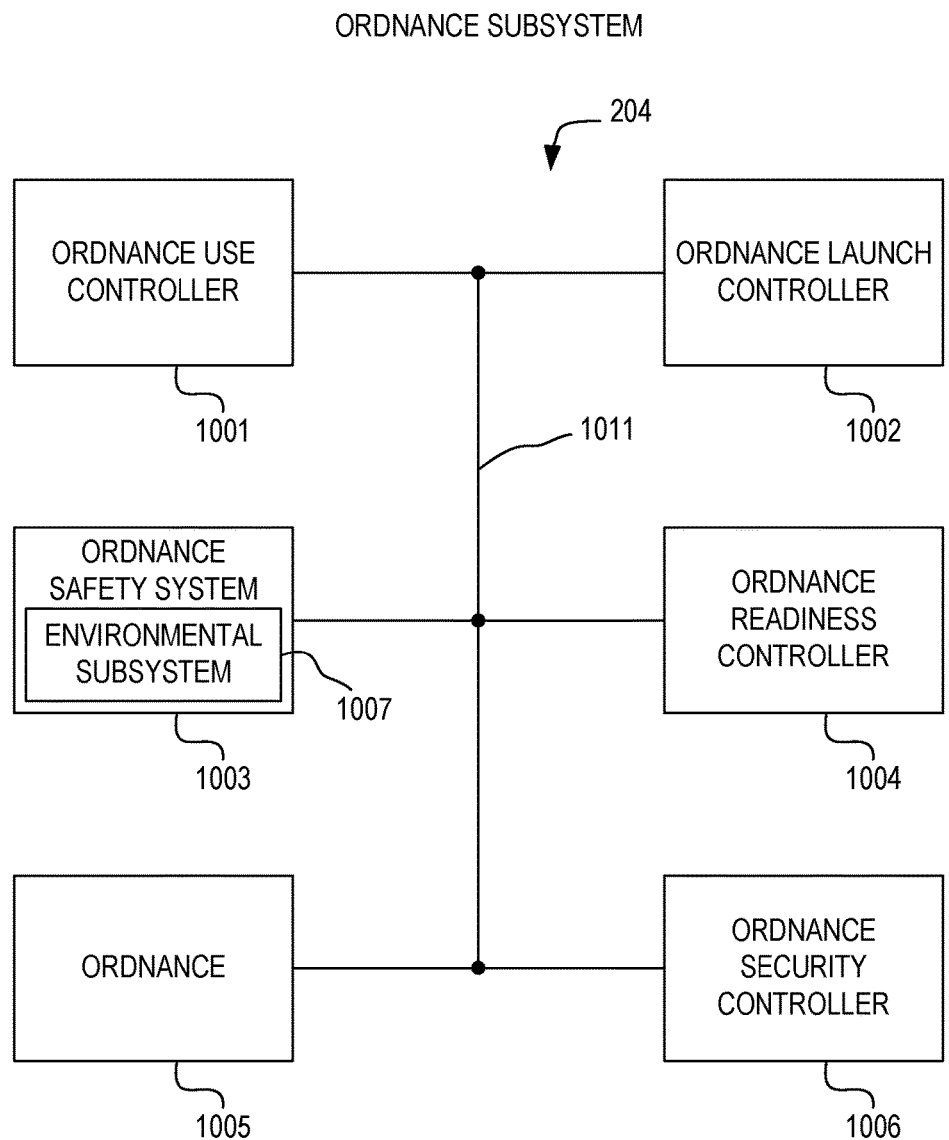
FIG. 10 is a block diagram illustrating an ordnance subsystem of an anti-aircraft AUS in accordance with at least one embodiment.

FIG. 10 is a block diagram illustrating an ordnance subsystem of an anti-aircraft AUS in accordance with at least one embodiment. Ordnance subsystem 204 comprises ordnance use controller 1001, ordnance launch controller 1002, ordnance safety system 1003, ordnance readiness controller 1004, ordnance 1005, and ordnance security controller 1006. Each of such elements is coupled to at least another of such elements. In the illustrated example, the elements are coupled to each other via interconnect 1011. Ordnance safety system 1003 comprises environmental subsystem 1007.

Ordnance 1005 may, for example, be an anti-aircraft missile, such as a radar guided missile or an electro-optically guided missile. Ordnance security controller 1006 can operate to maintain security of ordnance 1005. As an example, ordnance security controller 1006 can be configured to detect tampering with anti-aircraft AUS 100 that poses a security risk to ordnance 1005. Ordnance security controller 1006 can be configured, for example, to temporarily or permanently disable ordnance 1005 in response to a detected security risk.

Ordnance safety system 1003 can monitor conditions affecting safety of ordnance 1005. As an example, ordnance safety system 1003 can include environmental subsystem 1007. Environmental subsystem 1007 can monitor environmental conditions to which ordnance 1005 is exposed. Based on the monitored environmental conditions, ordnance safety system 1003 can determine whether the safety of ordnance 1005 has been compromised. In the event of the safety has been compromised, ordnance safety system 1003 can communicate a warning to other components of ordnance subsystem 204, such as to ordnance readiness controller 1004, ordnance use controller 1001, and ordnance launch controller 1002 to warn of potential safety risks concerning ordnance 1005. The other components can perform risk mitigation actions, such as inhibiting launch of ordnance 1005, rendering ordnance 1005 inert, or jettisoning ordnance 1005. The jettison process can be coordinated with other subsystems, such navigation subsystem 206, sensor subsystem 208, and database subsystem 205, to command self-destruction of ordnance 1005 after ordnance 1005 has been jettisoned to a safe location.

Ordnance readiness controller 1004 manages readiness of ordnance 1005 for use. Ordnance readiness controller 1004 can receive ordnance security information from ordnance security controller 1006, ordnance safety information from ordnance safety system 1003, and ordnance self-test information from ordnance 1005. Ordnance readiness controller 1004 can use such information to determine an overall readiness of ordnance 1005 for use.

Ordnance use controller 1001 manages confirmation of authority to use ordnance 1005. For example, ordnance use controller can receive a message via communications subsystem 201, which may have been decrypted via cryptographic system 1106, to authorize the use of ordnance 1005 or alternatively, to delegate the authority to use ordnance 1005 to processing subsystem 203, allowing anti-aircraft AUS 100 to use ordnance 1005 autonomously.

Ordnance launch controller 1002 controls a launch sequence of ordnance 1005 when ordnance use controller 1001 has confirmed authority to use ordnance 1005. Ordnance launch controller 1002 monitors conditions for a safe launch of ordnance 1005 and is able to inhibit launch when such conditions are not met and to proceed with launch when such conditions are met.

Figure 11:
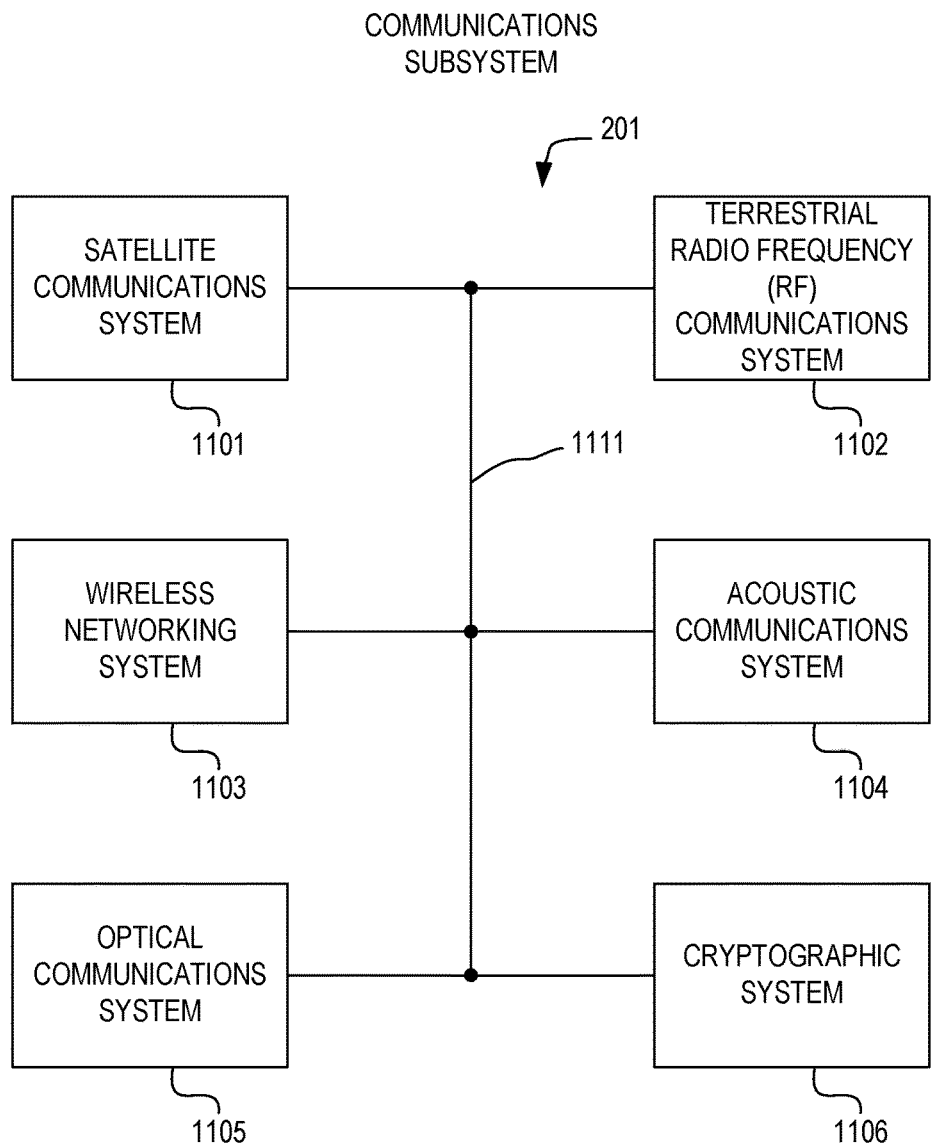
FIG. 11 is a block diagram illustrating a communications subsystem of an anti-aircraft AUS in accordance with at least one embodiment.

FIG. 11 is a block diagram illustrating a communications subsystem of an anti-aircraft AUS in accordance with at least one embodiment. Communications subsystem 201 comprises satellite communications system 1101, terrestrial radio frequency (RF) communications system 1102, wireless networking system 1103, acoustic communications system 1104, optical communications system 1105, and cryptographic system 1106. Each of such elements is coupled to at least another of such elements. In the illustrated example, the elements are coupled to each other via interconnect 1111.

Satellite communications system 1101 can comprise, for example, a Fleet Satellite Communications System (FLT-SATCOM) transceiver, an Ultra High Frequency (UHF) Follow-On (UFO) transceiver, a Mobile User Objective System (MUOS) transceiver, and a commercial satellite transceiver, such as an IRIDIUM satellite transceiver. Terrestrial RF communications system 1102 can comprise, for example, a terrestrial RF modem operating on one or more bands, such as a High Frequency (HF) band, a Very High Frequency (VHF) band, an Ultra High Frequency (UHF) band, and a microwave (μwave) band. Wireless networking system 1103 can comprise a WIFI wireless network transceiver (WIFI is a registered trademark of Wi-Fi Alliance), a BLUETOOTH wireless network transceiver (BLUETOOTH is a registered trademark of Bluetooth SIG, Inc.), a WIGIG wireless network transceiver (WIGIG is a registered trademark of Wi-Fi Alliance), and another type of wireless network transceiver. Acoustic communications system 1104 can comprise an acoustic modem. Optical communications system 1105 may comprise, for example, a blue/green laser communications system.

Figure 12:
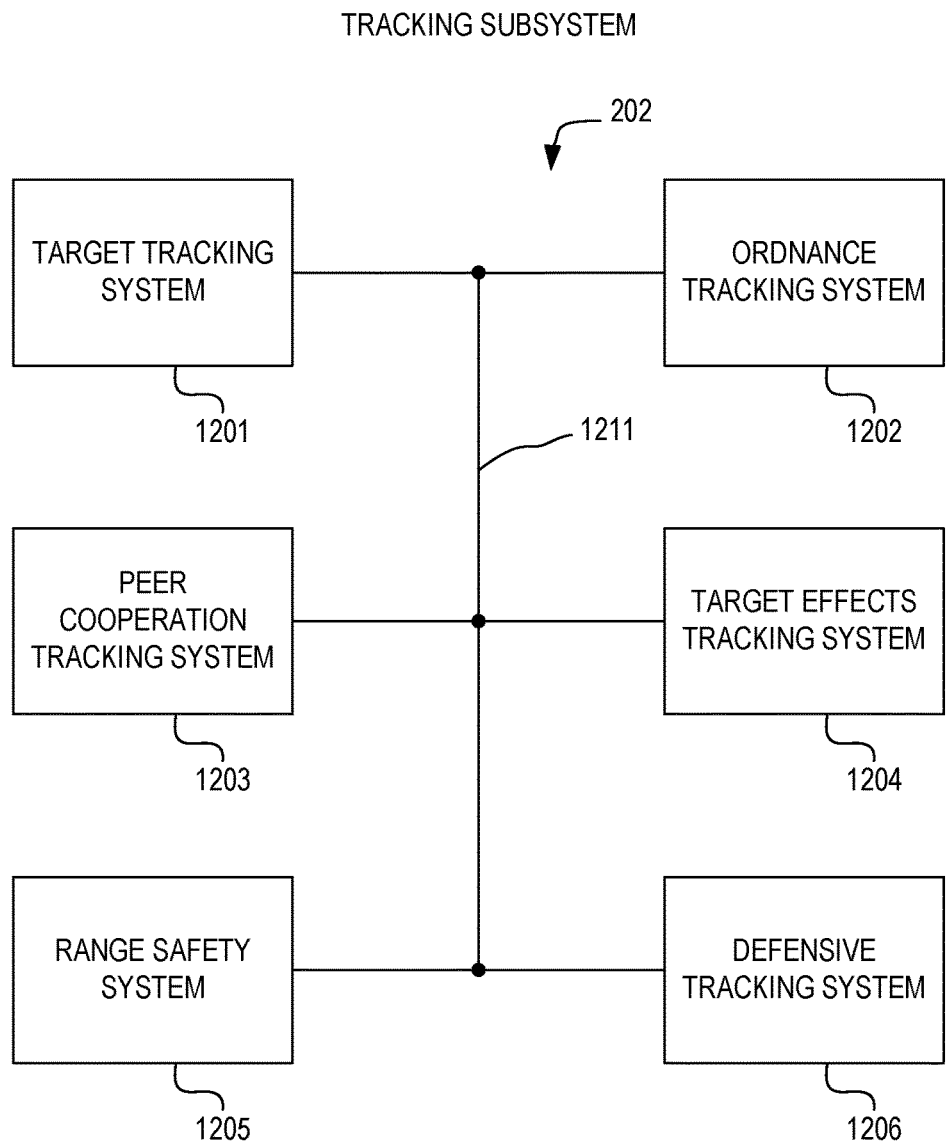
FIG. 12 is a block diagram illustrating a tracking subsystem of an anti-aircraft AUS in accordance with at least one embodiment.

FIG. 12 is a block diagram illustrating a tracking subsystem of an anti-aircraft AUS in accordance with at least one embodiment. Tracking subsystem 202 comprises target tracking system 1201, ordnance tracking system 1202, peer cooperation tracking system 1203, target effects tracking system 1204, range safety system 1205, and defensive tracking system 1206. Each of such elements is coupled to at least another of such elements. In the illustrated example, the elements are coupled to each other via interconnect 1211.

Target tracking system 1201 provides an ability to track a target acquired by sensor subsystem 208. Peer cooperation tracking system 1203 provides an ability to cooperate with the tracking subsystems of other instances of anti-aircraft AUS 100, allowing such other instances to act as peers in tracking. Defensive tracking system 1206 allows anti-aircraft AUS 100 to track threats against itself. Ordnance tracking system 1202 tracks ordnance 1005 after ordnance 1005 is launched to engage a target. Target effects tracking system 1204 tracks the effects of ordnance 1005 on the target. Range safety system 1205 obtains ordnance trajectory information as to the trajectory of ordnance 1005, for example, from ordnance tracking system 1202. Range safety system 1205 can take protective action, for example, commanding destruction of ordnance 1005, if ordnance 1005 fails to maintain its intended trajectory.

Figure 13:
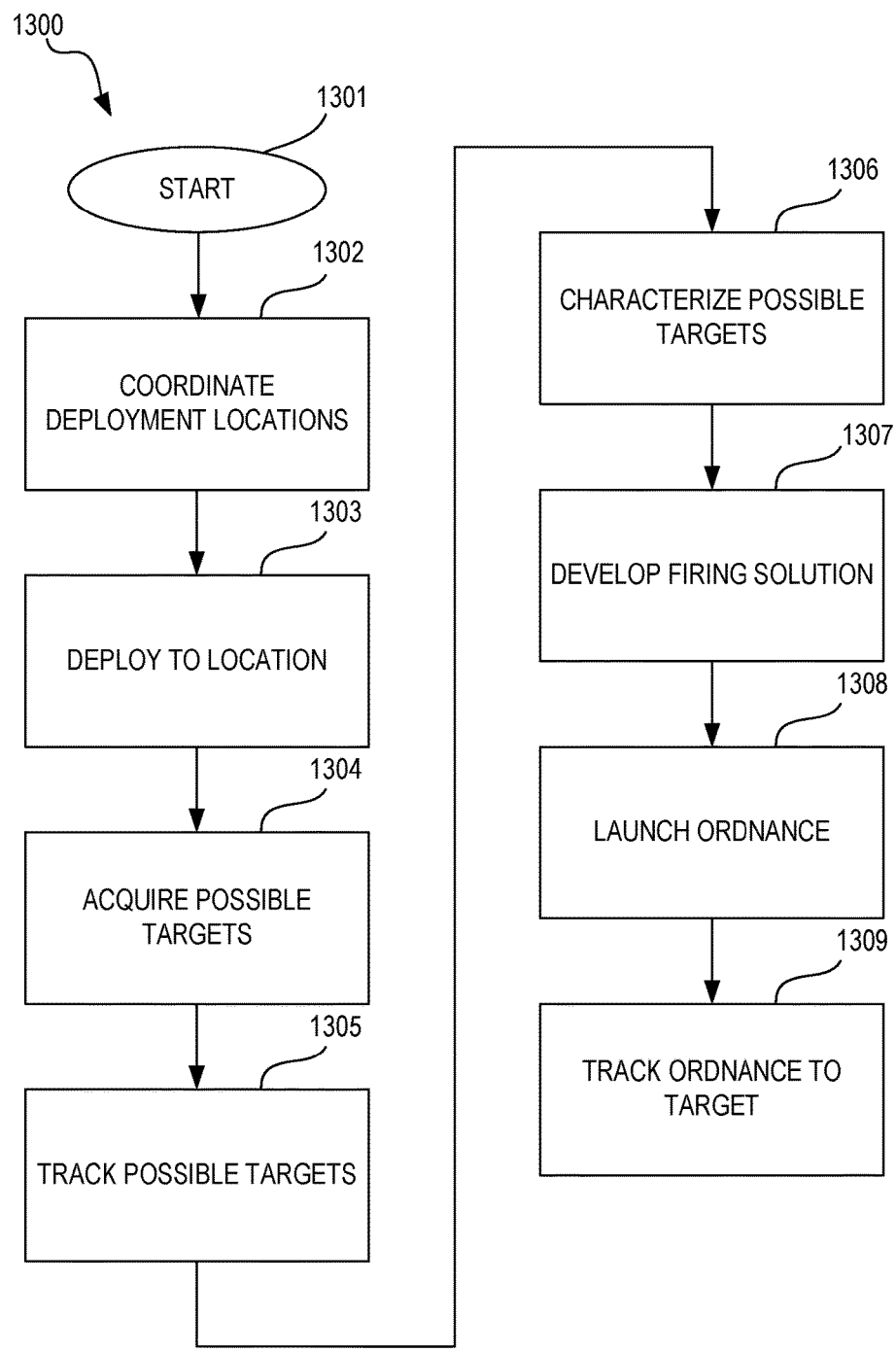
FIG. 13 is a flow diagram illustrating a method in accordance with at least one embodiment.

FIG. 13 is a flow diagram illustrating a method in accordance with at least one embodiment. Method 1300 begins at block 1301 and continues to block 1302. At block 1302, anti-aircraft AUS 100 coordinates deployment locations. A deployment location of anti-aircraft AUS 100 can be coordinated with other locations of other assets, such as locations of other instances of anti-aircraft AUS 100 and locations of naval vessels. Anti-aircraft AUS 100 can use communications subsystem 201 to communicate with such other instances of anti-aircraft AUS 100 and such naval vessels. As an example, the coordination of deployment locations can provide force protection not only for anti-aircraft AUS 100 itself and any peers that may accompany it, but also for a group of naval vessels it and any peers accompany. The protection can be provided when the naval vessels are at anchor and when the naval vessels are underway. From block 1302, method 1300 continues to block 1303. At block 1303, anti-aircraft AUS 100 deploys itself to its deployment location. As an example, the deployment location may be a fixed location, or, as another example, the deployment location may be a point along a path of multiple locations among which anti-aircraft AUS 100 is configured to move. As one example, anti-aircraft AUS 100 may be configured to move from one deployment location to another deployment location. As another example, anti-aircraft AUS 100 may be configured to move to a deployment location having a defined relationship (e.g., a standoff distance) to other assets, such as peers and naval vessels, and to maintain the defined relationship by moving in a similar direction and at a similar speed as the other assets. From block 1303, method 1300 continues to block 1304. At block 1304, anti-aircraft AUS 100 acquires possible targets. The possible targets can be acquired based on information obtained from at least one sensor, such as at least one sensor of sensor subsystem 208, at least one sensor of a sensor subsystem of a peer anti-aircraft AUS, or at least one sensor of another asset, such as a naval surface vessel, a naval subsurface vessel, an aircraft, or a spacecraft. From block 1304, method 1300 continues to block 1305. At block 1305, anti-aircraft AUS 100 tracks possible targets. The tracking of possible targets can be performed, for example, by tracking subsystem 202. From block 1305, method 1300 continues to block 1306. At block 1306, anti-aircraft AUS 100 characterizes possible targets. As an example, the characterization of possible targets can be performed by processing subsystem 203 with reference to data stored in database subsystem 205. From block 1306, method 1300 continues to block 1307. At block 1307, method 1300 develops a firing solution. As an example, processing subsystem 203 can develop the firing solution based on information obtained from tracking subsystem 202 with reference to data stored in database subsystem 205. From block 1307, method 1300 continues to block 1308. At block 1308, anti-aircraft AUS 100 launches ordnance against a target. As an example, the ordnance can be launched by ordnance subsystem 204. From block 1308, method 1300 continues to block 1309. At block 1309, anti-aircraft AUS 100 tracks ordnance to the target. As an example, the ordnance can be tracked to the target by tracking subsystem 202.

Figure 14:
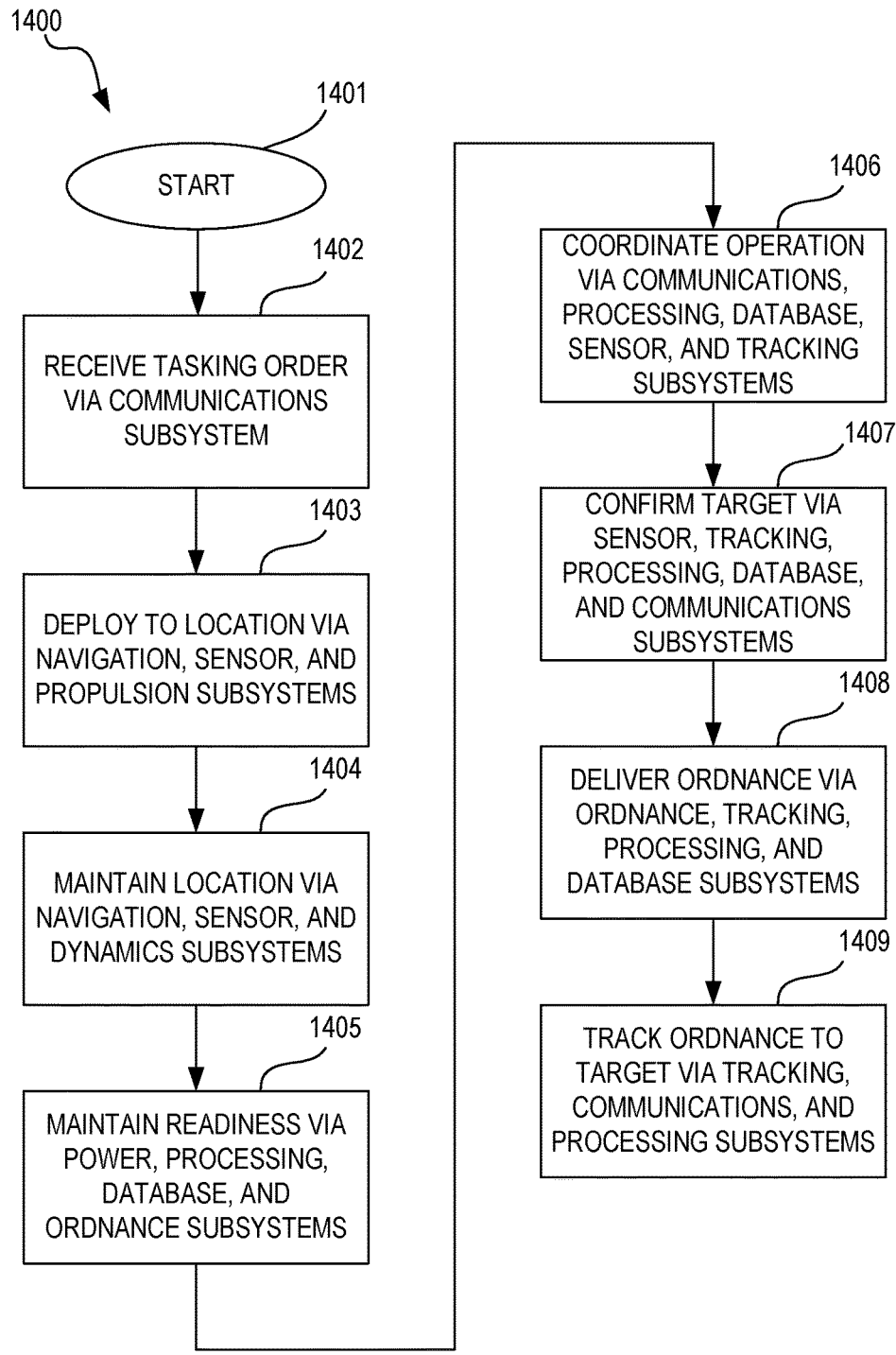
FIG. 14 is a flow diagram illustrating a method in accordance with at least one embodiment.

FIG. 14 is a flow diagram illustrating a method in accordance with at least one embodiment. Method 1400 begins at block 1401 and continues to block 1402. At block 1402, anti-aircraft AUS 100 receives a tasking order via communications subsystem 201. The tasking order may, for example, be received from an authority competent to authorize the employment of the ordnance of ordnance subsystem 204. As an example, the tasking order may be communicated in encrypted form, and cryptographic system 1106 of communications subsystem 201 can decrypt the encrypted tasking order. From block 1402, method 1400 continues to block 1403. At block 1403, anti-aircraft AUS 100 deploys to a deployment location via navigation subsystem 206, sensor subsystem 208, and propulsion subsystem 209. The deployment location may be a fixed location or a location relative to other objects, which need not be fixed and may be moving. The other objects may be, for example, peers or naval vessels. Anti-aircraft AUS 100 may move in formation with such objects. From block 1403, method 1400 continues to block 1404. At block 1404, anti-aircraft AUS 100 maintains its location via navigation subsystem 206, sensor subsystem 208, and dynamics subsystem 207. The location may be a fixed location or a relative location in relation to other objects, which may be moving. From block 1404, method 1400 continues to block 1405. At block 1405, anti-aircraft AUS 100 maintains its readiness via power subsystem 210, processing subsystem 203, database subsystem 205, and ordnance subsystem 204. As examples, power subsystem 210 can obtain power from power source 306 to be used by charging system 304 to maintain a desired state of charge of battery 305, ordnance subsystem 204 can use ordnance readiness controller 1004 to assure readiness of ordnance 1005, and processing subsystem 203 and database subsystem 205 can monitor a state of anti-aircraft AUS 100 and its surroundings to assure the state is consistent with readiness. From block 1405, method 1400 continues to block 1406. At block 1406, anti-aircraft AUS 100 coordinates operation via communications subsystem 201, processing subsystem 203, database subsystem 205, sensor subsystem 208, and tracking subsystem 202. As examples, anti-aircraft AUS 100 can coordinate its operation with peer anti-aircraft AUSs and other craft, such as naval vessels. For example, anti-aircraft AUS 100 can coordinate the portions of airspace and water it monitors using sensor subsystem 208 with portions of airspace and water its peers monitor with their respective sensor subsystems. As another example, anti-aircraft AUS 100 can coordinate its operation with other assets, such as naval surface vessels, naval subsurface vessels, aircraft, and spacecraft. From block 1406, method 1400 continues to block 1407. At block 1407, anti-aircraft AUS 100 confirms a target via sensor subsystem 208, tracking subsystem 202, processing subsystem 203, database subsystem 205, and communications subsystem 201. As an example, anti-aircraft AUS 100 can analyze, using processing subsystem 203, data from sensor subsystem 208 and tracking subsystem 202, with reference to stored data of database subsystem 205, to obtain a confirmation that a possible target is an actual target. As an example, anti-aircraft AUS 100 can communicate with peers or other assets via communications subsystem 201 to assist in the confirmation of the target. From block 1407, method 1400 continues to block 1408. At block 1408, anti-aircraft AUS 100 delivers ordnance via ordnance subsystem 204, tracking subsystem 202, processing subsystem 203, and database subsystem 205. As an example, ordnance launch controller 1002 consults ordnance use controller 1001 to confirm permission for use of ordnance 1005, consults ordnance security controller 1006 to confirm security of ordnance 1005, consults ordnance safety system 1003 to confirm safety of ordnance 1005 for launch, and consults ordnance readiness controller 1004 to confirm readiness of ordnance 1005 for launch. Upon proper confirmations, ordnance launch controller 1002 launches ordnance 1005 toward the target. From block 1408, method 1400 continues to block 1409. At block 1409, anti-aircraft AUS 100 tracks ordnance to the target via tracking subsystem 202, communications subsystem 201, and processing subsystem 203. As an example, anti-aircraft AUS 100 can track ordnance 1005 to the target by itself or in coordination with other assets, for example, via communications subsystem 201.

The concepts of the present disclosure have been described above with reference to specific embodiments. However, one of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A submersible vessel comprising:
   a hull, the hull containing a plurality of subsystems, the subsystems comprising:
   a sensor subsystem configured to sense potential target information regarding a potential target;
   a database subsystem configured to store target characterization information;
   a processing subsystem coupled to the sensing subsystem and to the database subsystem, the processing subsystem configured to process the potential target information according to the target characterization information to confirm the potential target as being a confirmed target; and an ordnance subsystem, the ordnance subsystem comprising an ordnance magazine configured to store ordnance, the ordnance deployable against the confirmed target, wherein the confirmed target is an aircraft.

2. The submersible vessel of claim 1, wherein the processing subsystem is configured to provide autonomous control of the submersible vessel.

3. The submersible vessel of claim 1, further comprising: a communications subsystem configured to provide communication with a second vessel for coordinating engagement of the confirmed target.

4. The submersible vessel of claim 3, wherein the second vessel is a second submersible vessel.

5. The submersible vessel of claim 4, wherein the second vessel comprises a second sensor subsystem configured to sense additional potential target information, wherein the submersible vessel is configured to receive, via the communications subsystem, the additional potential target information and to process, via the processing subsystem, the additional potential target information according to the target characterization information to confirm the potential target as being the confirmed target.

6. The submersible vessel of claim 1, further comprising: a tracking subsystem configured to track the confirmed target.

7. The submersible vessel of claim 1, wherein the sensor subsystem comprises a passive aircraft sensor subsystem.

8. A system comprising:
a plurality of submersible vessels, each submersible vessel of the plurality of submersible vessels comprising:
a sensor subsystem configured to sense potential target information regarding a potential target;
a database subsystem configured to store target characterization information;
a processing subsystem coupled to the sensing subsystem and to the database subsystem, the processing subsystem configured to process the potential target information according to the target characterization information to confirm the potential target as being a confirmed target; and
an ordnance subsystem, the ordnance subsystem comprising an ordnance magazine configured to store ordnance, the ordnance deployable against the confirmed target, wherein the confirmed target is an aircraft.

9. The system of claim 8, wherein each of the plurality of submersible vessels is configured to operate autonomously and cooperatively.

10. The system of claim 8, wherein each of the plurality of submersible vessels further comprises:
a communications subsystem configured to provide communication with others of the plurality of submersible vessels for coordinating engagement of a confirmed target.

11. The system of claim 10, wherein each of the plurality of submersible vessels further comprises:
a navigation subsystem configured to identify a respective location of a respective one of the submersible vessels relative to the others of the plurality of submersible vessels.

12. The system of claim 10, wherein the plurality of submersible vessels are configured to share the potential target information regarding the potential target among each other.

13. The system of claim 8, wherein each of the plurality of submersible vessels further comprises:
a tracking subsystem configured to track the confirmed target.

14. The system of claim 8, wherein the sensor subsystem comprises a passive aircraft sensor subsystem.

15. A method comprising:
deploying to a location via a navigation subsystem, a sensor subsystem, and a propulsion subsystem;
maintaining the location via the navigation subsystem, the sensor subsystem, and a dynamics subsystem;
maintaining readiness via a power subsystem, a processing subsystem, a database subsystem, and an ordnance subsystem;
coordinating operation via a communications subsystem, the processing subsystem, the database subsystem, the sensor subsystem, and a tracking subsystem;
confirming a target via the sensor subsystem, the tracking subsystem, the processing subsystem, the database subsystem, and the communications subsystem;
delivering ordnance via the ordnance subsystem, the tracking subsystem, the processing subsystem, and the database subsystem; and
tracking the ordnance to the target via the tracking subsystem, the communications subsystem, and the processing subsystem.

16. The method of claim 15, further comprising:
receiving a tasking order via the communications subsystem.

17. The method of claim 15, wherein the coordinating the operation comprises passively sensing an aircraft via a passive aircraft sensor subsystem of the sensor subsystem.

18. The method of claim 15, wherein a plurality of submersible vessels cooperatively develop a firing solution for at least one of the plurality of submersible vessels to engage the target with the ordnance.

19. The method of claim 15, wherein the maintaining the location comprises maintaining a standoff distance around a plurality of naval surface vessels.

20. The method of claim 15, wherein the delivering the ordnance comprises launching a missile and wherein the target comprises an aircraft.

* * * * *